March 31, 1925. Re. 16,034
E. L. SHARPNECK
SHOE AND HEEL THEREFOR
Original Filed April 19, 1915
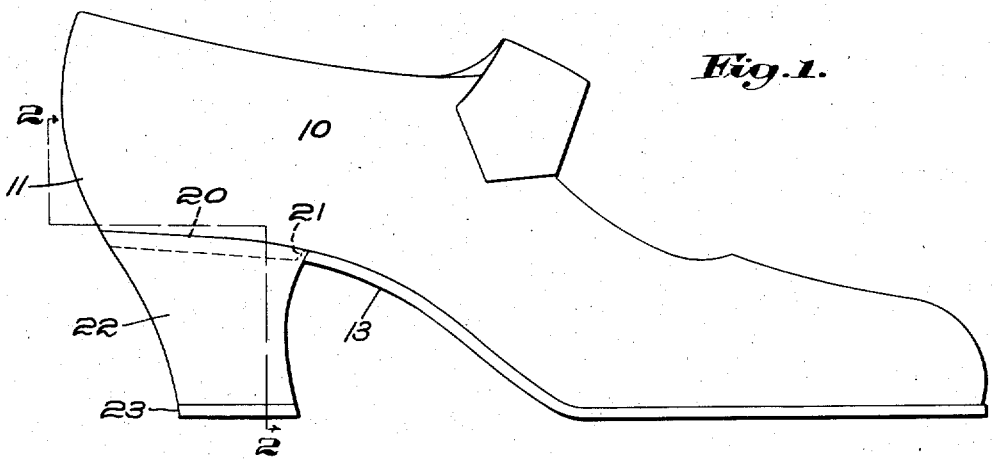
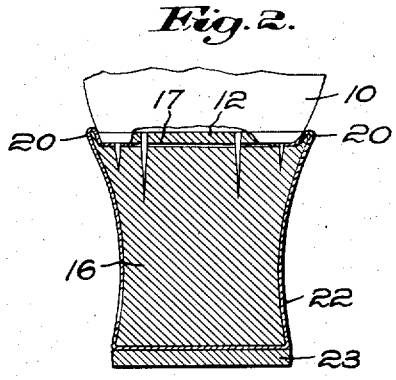
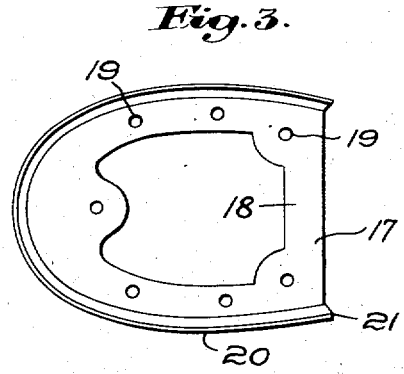
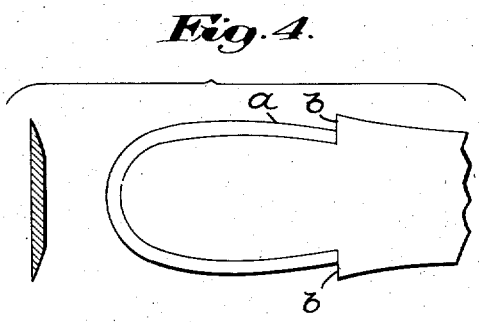
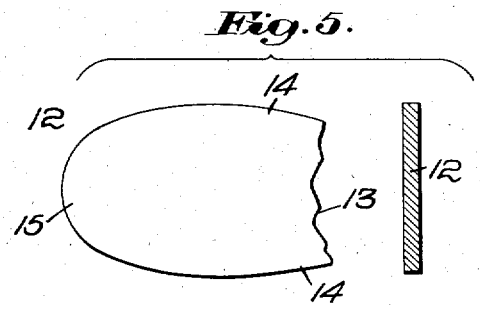
Inventor:
Eliel L. Sharpneck.
by Emery, Booth, Janney & Varney
Attys Reissued Mar. 31, 1925. Re. 16,034

UNITED STATES PATENT OFFICE.

ELIEL L. SHARPNECK, OF BAKERSFIELD, CALIFORNIA, ASSIGNOR TO S-M-P WOOD HEEL COMPANY, OF HAVERHILL, MASSACHUSETTS, A CORPORATION OF MASSACHUSETTS.

SHOE AND HEEL THEREFOR.

Original No. 1,288,233, dated December 17, 1918, Serial No. 22,271, filed April 19, 1915. Application for reissue filed March 12, 1920. Serial No. 365,295.

*To all whom it may concern:*

Be it known that I, ELIEL L. SHARPNECK, a citizen of the United States, formerly of Winthrop, in the county of Suffolk and State of Massachusetts, but now of Bakersfield, in the county of Kern and State of California, have invented certain new and useful Improvements in Shoes and Heels Therefor, of which the following is a specification, reference being had to the accompanying drawings, forming part thereof.

This invention has reference to improvements in shoes or boots and in heels therefor.

One object of the invention is to construct a boot or shoe so that the heel seat of the sole may retain its original thickness at the edge.

Another object of the invention is to construct a boot or shoe so that the heel thereof may be adjusted relative to the heel seat of the sole and to the counter which has heretofore been impossible, whereby the outer surface of the heel may merge more exactly into the curve of the counter.

Another object of the invention is to construct a heel for boots or shoes so that, when said heel is made of wood, any tendency to split the heel by pressure from the counter is eliminated.

Another object of the invention is to simplify the construction of the heel, thereby to reduce the cost of manufacturing the boot or shoe.

Other objects of the invention will appear from the following description.

The invention consists in the improved shoe having the heel seat received by the improved heel frame.

The invention also consists in the improved heel.

The invention also consists in such other novel features of construction and combination of parts as shall hereinafter be more fully described and pointed out in the claims.

Figure 1, represents a side elevation of parts of a shoe illustrating this invention.

Fig. 2, represents a sectional view of the same taken on line 2—2, Fig. 1.

Fig. 3, represents a plan view of the improved heel to show the heel seat frame.

Fig. 4, represents respectively plan and sectional views of a heel seat as heretofore constructed to receive a heel.

Fig. 5, represents similar views of the heel seat used in the improved shoe.

Similar characters of reference designate corresponding parts throughout.

In the manufacture of shoes having heels of the variety known as French heels, Cuban heels and modifications thereof it has been customary to make the heels of wood with concavities to receive the heel seats of the shoe soles. To facilitate the cutting out of said concavities the grain of the wood of said heels usually extends transversely of the height of the heel and lengthwise of the shoe and the edge of said concavity must of necessity be thick in order to retain some strength of the material. In order to accommodate these thick edges of the heel concavity it has been necessary to place the heel top against the heel seat *a*, Fig. 4, and mark the location for the shoulders *b*, *b*, then cut away the heel seat to form such shoulders and at or about the same time to skive the edge of the heel seat to conform it to the concavity of the heel. In this process the stitches securing the heel seat to the counter portion of the shoe often were cut thus practically destroying this portion of the shoe. Another objection has been that the pressure of the counter tends to spread the concave top of the heel which often splits along its grain particularly at the edges of the concavity.

In carrying my invention into practice one of my objects has been to produce a shoe having better wearing qualities and of better appearance than those heretofore constructed and to reduce the cost of manufacture. To this end I construct a shoe 10 having the counter 11 and the heel seat 12 having edges which are the full thickness of the sole 13 and are approximately parallel at 14, 14 and then curve as at 15, see Fig. 5.

In conjunction with the shoe thus described I use the heel 16 which preferably is of wood or other suitable material adapted to receive securing nails. To this heel 16 I attach the flat frame plate 17 preferably cut away as at 18, 19, to permit the passage of securing nails, and having the flaring lip 20 the front ends 21, 21 of which are spaced apart substantially the width of the heel 16 and are adapted to receive between them the edge portions 14, 14 of the heel seat 12. This heel frame is or may be of comparatively thin metal and after its attachment to the heel 16 and to said frame, the lower edges of the heel covering 22 are turned against the lower end of the heel 16, and secured, and the tread piece 23 is secured in place; the upper edge portions of the covering 22 are turned inwardly over the edge of the lip 20 (Fig. 2) and secured, thus constituting a heel having a receptacle for the heel seat adapted to be flexed, as to its edge, to conform to the shape of the shoe counter against which the covered lip 20 is secured.

In the application of this improved heel to a shoe no cutting of the heel seat shown in Fig. 5 is necessary. The heel plate is placed flat-wise against the surface of the heel seat 12 with the lip 20 embracing the rear portion of the heel seat and the ends 21, 21 of said lip at the edges 14, 14 of the heel seat. The heel is then readily adjusted along the heel seat until the covered edge of said lip 20 is brought closely against the curved counter portion of the shoe and, in such adjustment, the ends 21, 21 of said lip closely hug the edges 14, 14 of the heel seat. After such adjustment of the heel nails are driven through the heel portion of the shoe into the heel 16 which nails act to draw said heel and its frame closely to the shoe and to secure all of these parts together.

The height of the lip 20 is preferably only such as will accord with or follow the curve of the counter portion of the shoe but said lip may be of a sufficient height to assist in sustaining the shoe counter or to contribute to the stiffening of the shoe counter, and having a tendency to resist the breaking down of the counter without being unduly rigid.

It is quite essential that the heel frame for the heel seat should not be of a size or shape materially to change the ordinary shape of the heel particularly when said heel and frame are covered. I have found it desirable to make this heel frame plate 17 and its lip 20 of comparatively thin sheet metal but it is evident that, when preferred, other material may be used. I also consider the heel 16 and its frame 17, 20, having the unitary covering 22 of importance as otherwise the line of juncture between said heel and said frame might be objectionable in appearance.

The covering 22 may be of leather, fabric, celluloid or any other material known in this art and the term "unitary" used herein with reference to such covering refers more particularly to the exposed portions at the sides and rear of the heel. In shoes having what is known as the full "Louis" heel the front portion or surface of the heel may be covered as is usual, by a split from the sole, without departing from the spirit of this invention.

Having thus described my invention I claim as new and desire to secure by Letters Patent.

1. A shoe comprising a sole having a heel seat, a heel permanently and directly attached to said heel seat, including a wooden body part having an upstanding relatively thin lip at the sides and back thereof approximating in height the thickness of said heel seat and concealing the side and rear edges of said heel seat, said heel presenting a relatively flat surface adjacent the inner edge of said lip and said heel seat having its side edges closely received and confined by said lip, and a unitary covering extending over said body part and turned inwardly over said lip.

2. A shoe comprising a sole providing a heel seat, a heel plate having an upstanding lip surrounding the side and rear edges of said heel seat, and a heel including a body part permanently secured to said heel plate, said heel seat permanently secured to said heel body part with said heel plate interposed between said heel seat and said heel body part, and a covering concealing said body part and said upstanding lip.

3. A shoe comprising a sole having a heel seat, a heel permanently and directly attached to said heel seat, said heel providing a heel plate having an upstanding lip surrounding and concealing the side and back edges of said heel seat, and a unitary covering for said heel and said lip, said covering turned inward between said lip and the edge of said heel seat.

ELIEL L. SHARPNECK.